US012749796B2

(12) United States Patent
Walker et al.

(10) Patent No.: US 12,749,796 B2
(45) Date of Patent: Sep. 29, 2026

(54) CHASSIS WITH A HANDLE HAVING AN ANTENNA FOR WIRELESS COMMUNICATION

(71) Applicant: Advanced Energy Industries, Inc., Denver, CO (US)

(72) Inventors: Carl Kenneth Walker, Taipei City (TW); Chang-Chieh Yu, Taipei City (TW); Vincent Vicente Vivar, Calumpit (PH); Donald Cedrick Ongyanco, Quezon City (PH); John Amos Tan, Quezon City (PH); Khanderao Madhav Gaikwad, Metro Manila (PH); Ben Idris Pulumbarit Pascual, Quezon City (PH); Paolo Chavez, Pasig City (PH)

(73) Assignee: AES Global Holdings PTE. Ltd., Singapore (SG)

( * ) Notice: Subject to any disclaimer, the term of this patent is extended or adjusted under 35 U.S.C. 154(b) by 0 days.

(21) Appl. No.: 18/686,001

(22) PCT Filed: Apr. 7, 2023

(86) PCT No.: PCT/US2023/017863

§ 371 (c)(1),
(2) Date: Feb. 23, 2024

(87) PCT Pub. No.: WO2023/196582

PCT Pub. Date: Oct. 12, 2023

(65) Prior Publication Data

US 2025/0149774 A1 May 8, 2025

Related U.S. Application Data

(60) Provisional application No. 63/362,724, filed on Apr. 8, 2022.

(51) Int. Cl.
*H01Q 1/22* (2006.01)
*H01Q 1/24* (2006.01)
(Continued)

(52) U.S. Cl.
CPC ............. *H01Q 1/2208* (2013.01); *H01Q 1/24* (2013.01); *H01Q 7/00* (2013.01); *H04B 5/48* (2024.01)

(58) Field of Classification Search
CPC .......... H01Q 1/2208; H01Q 1/24; H01Q 7/00; H04B 5/48; H04B 5/26; H04B 5/77
See application file for complete search history.

(56) References Cited

U.S. PATENT DOCUMENTS

| | | | | |
|---|---|---|---|---|
| 2017/0111759 | A1* | 4/2017 | Ewing | H04W 4/80 |
| 2019/0386711 | A1 | 12/2019 | He et al. | |
| 2021/0370877 | A1* | 12/2021 | Peterson | B60R 16/023 |

FOREIGN PATENT DOCUMENTS

| | | |
|---|---|---|
| KR | 20190055981 A | 5/2019 |

OTHER PUBLICATIONS

International Search Report & Written Opinion for PCT Application No. PCT/US2023017863, mailed Aug. 25, 2023; 15 pages.

* cited by examiner

*Primary Examiner* — David E Lotter

(57) ABSTRACT

A wireless communication system comprises a transceiver, a housing, and a handle. The transceiver comprises an antenna. The housing has an interior volume. The handle is coupled to the housing externally from the interior volume, and the antenna is positioned within the handle.

17 Claims, 8 Drawing Sheets

(51) Int. Cl.
*H01Q 7/00* (2006.01)
*H04B 5/48* (2024.01)

- PRIOR ART -

- PRIOR ART -

CHASSIS WITH A HANDLE HAVING AN ANTENNA FOR WIRELESS COMMUNICATION

CROSS-REFERENCE TO RELATED APPLICATIONS

The present invention is a 371 application of International PCT Application No.: PCT/US2023/017863, filed Apr. 7, 2023, which claims the benefit to and priority of U.S. Provisional Application No. 63/362,724, filed Apr. 8, 2022, and U.S. Provisional Application No. 63,362,357, filed Apr. 1, 2022. The entire disclosure of each application is incorporated herein by reference.

TECHNICAL FIELD

Aspects of the disclosure relate to near field communication (NFC) technology, and more particularly to antenna design for enabling NFC communication with components within an electrically conductive housing.

BACKGROUND

NFC is a short-range wireless communication protocol that be used for contactless exchange of data over short distances. Point-to-point communication between devices using NFC may be within a range up to, for example, 20 cm range depending on antenna design.

In one example as illustrated in FIG. 1, a transmitter device 100 communicates with a tag 101. The tag 101 may be an active or passive device and may be read-only or have re-write capabilities. By means of an antenna 102 on the transmitter device 100 and an antenna 103 on the tag 101, carrier fields 104 are generated that transmit the communication between the devices 100, 101. In the case of a passive receiving device such as a passive tag 101 that does not have its own power supply, the carrier field 104 generated by the transmitter device 100 can be used to sufficiently draw operating power to receive the communication, power onboard components to gather desired data, and transmit the information back to the transmitter device 100. An active tag 101 has its own power supply that does not become energized by the carrier fields 104.

When within range and in a line-of-sight arrangement, communications between the transmitter device 100 and the tag 101 are reliable absent interference from other signals within the same communication frequency. However, communications between the devices 100, 101 begins to degrade and can become unreliable if the antennas 102, 103 are separated from the open air by housings or other support structures. Metallic or other electrically conductive housings into which a tag 101 may be placed may help shield EMI emissions out of the housing by the internal components or into the housing by external factors, but such shielded housing can make communication with the tag 101 poor or impossible if the metal housing surrounds the receiving antenna 103. Furthermore, interference from components inside the housing such as a switching converter may generate magnetic fields interference due to various switching components and magnetics inside the housing.

Because of wireless communications with a component or system within an electrically conductive housing can be unreliable, as shown in FIG. 2, communications with the component/system such as a power supply unit 200 are often handled by hardwired connections 201 between a communication device 202 within the housing of the component

200 and a communication port 203 attached to an exterior wall of the housing. Further, the communication port may be positioned in an inconvenient location on the housing such as in a rear wall 204 that may require deactivation of the system and uninstallation from a rack or maneuvering within a tight space to realize such communications.

The power supply unit 200 may use digital control with built-in parameter configuration features like allowing for the configuration of output voltage, current, power, fault diagnostics, and input/output power monitoring, etc. Configuring and reading these parameters can be accomplished over a communication bus 205 with an external communication system 206 such has a laptop computer or tablet, a specialized customer system interface/adapter, and the like. Some of the configurable parameters may be available for configuration when the hardware connection 201 is in an active/working mode, facilitated by trained service personnel over the wired communication bus 205.

SUMMARY

In accordance with one aspect of the present disclosure, a wireless communication system comprises a transceiver, a housing, and a handle. The transceiver comprises an antenna. The housing has an interior volume. The handle is coupled to the housing externally from the interior volume, and the antenna is positioned within the handle.

In accordance with another aspect of the present disclosure, a method of making a wireless communication system comprises positioning a communication antenna of a transceiver assembly within a handle and coupling the handle to an exterior of an enclosure, the enclosure having an interior volume.

BRIEF DESCRIPTION OF THE DRAWINGS

The drawings illustrate embodiments presently contemplated for carrying out the invention.

In the drawings.

Figure 1:
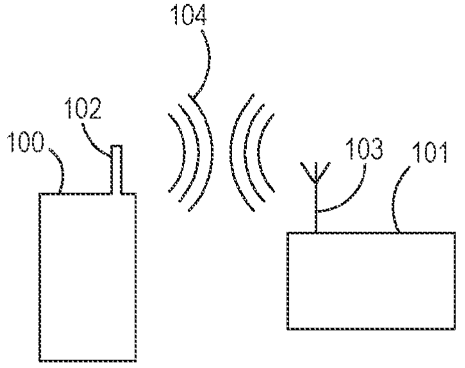
FIG. 1 is a block diagram of a known NFC system.
Figure 2:
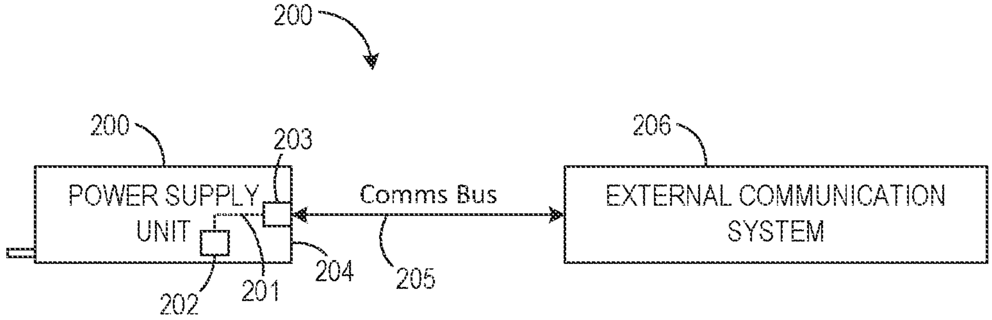
FIG. 2 is a block diagram of a known power supply communication scheme.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 3:
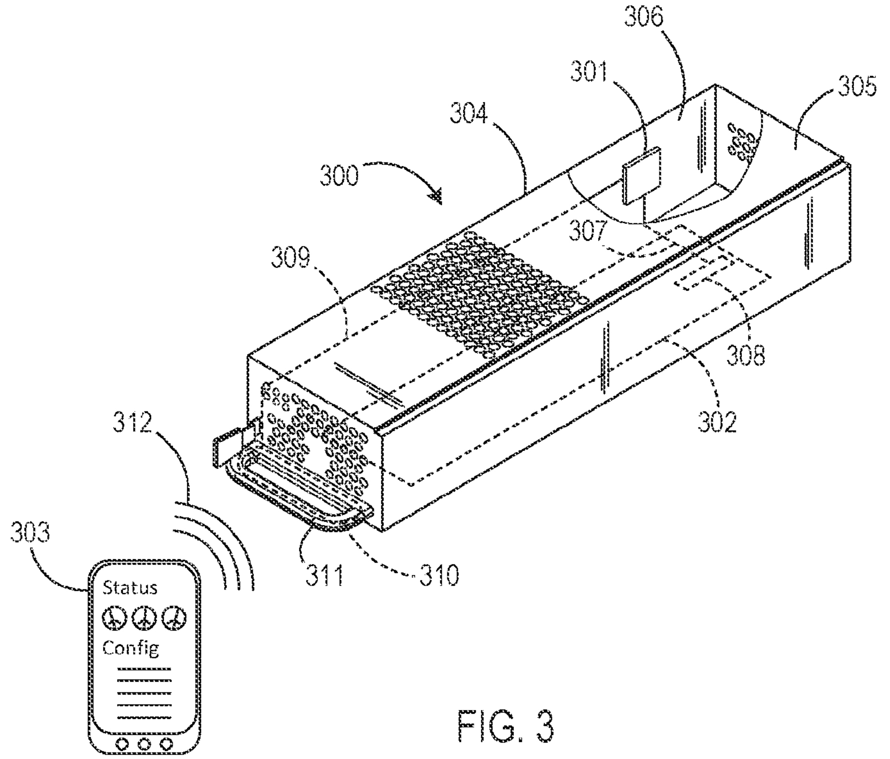
FIG. 3 illustrates an NFC communication arrangement according to an embodiment.

FIG. 3 illustrates an NFC communication arrangement according to an embodiment. A target system 300 such as a power supply is equipped with an NFC transceiver or tag device 301 for communicating operational parameters and other information of a power converter 302 of the power supply with an external NFC communication device 303. The target system 300 includes a metal enclosure or housing 304 having an internal volume into which the tag 301 and power converter 302 are positioned. The housing 304, being electrically conductive, can help shield EMI emissions into or out of the housing 304. Through a cutaway portion of a top wall 305 of the housing 304, the tag 301 is shown mounted to a side wall 306 and has one or more communication wires 307 coupling the tag 301 with a power converter communication component such as a communication IC 308. Communication via the communication wires 307 provides the tag 301 with access to information of the power converter 302 such as operational status parameters, configuration parameters, reporting parameters, and other information provided for communication outside the system. Communication between the tag 301 and the communication IC 308 may be based on the I2C protocol or other low-power communication protocol, for example.

The tag 301 also has one or more wires 309 coupling the tag 301 with an antenna 310 positioned externally to the housing 304. In one embodiment, as shown, the antenna 310 is positioned within a handle 311 mechanically attached to the housing 304. The handle 311 provides support for carrying the power supply, installing the power supply within a rack system, removing the power supply from the rack system, and other physical manipulations of the power supply. In one embodiment, the antenna 310 includes one or more loops of wire wound around an interior volume of the handle 311. In another embodiment, the antenna 310 includes one or more loops of copper spiraled along a printed circuit board positioned within the handle 311. To reduce interference with the carrier fields 312 transmitted between the antenna 310 and the communication device 303, the handle 311 may be constructed of carrier field permeable materials and/or positioned close to an exterior surface of the handle 311 while still remaining protected within the interior volume of the handle 311. The exterior positioning of the antenna 310 relative to the interior volume of the housing 304 allows the tag 301, positioned within the interior volume of the housing 304, to communicate with the communication device 303 with less interference and damping effects.

In one embodiment, the tag 301 is a passive device that receives energizing power from the carrier fields 312. The energizing power is sufficient to activate the tag 301 and to establish communication with the communication device 303. The energizing power may further be sufficient to power the communication IC 308, which has stored therein the parameters of interest. By also providing power for the communication IC 308, the communication device 303 may be able to receive status, configuration, and other parameters of the power converter 302 without the power converter 302 needing to be active, operational, or having additional power being supplied thereto. In another embodiment, while in operation, the power converter 302 may cause the communication IC 308 to update reportable parameters to the tag 301 for storage until requested by the communication device 303. In this case, the energizing power for activating the tag 301 may be sufficient to power the tag 301 without also providing power to the communication IC 308.

The passive device mode allows the target system 300 to be equipped with a built-in NFC interface that can be used to retrieve and write small size data. For example, the target system 300 can be configured during manufacturing or after receipt by a customer without applying input supply power to the unit. Examples of such configuration include enabling/disabling features, changing device address, setting limits and timings, etc. In addition, black-box data or fault history logs can be retrieved from a system that has had a hard failure and can no longer power up.

In another embodiment, the tag 301 is an active device and receives operational power from the power converter 302. As such, the tag 301 may be available for communication while the power converter 302 is supplying power to the tag 301 but unavailable in the absence of supplied power from the power converter 302. The active, or powered, mode allows larger data transfers than the passive mode. For example, if in-system programming was not implemented during manufacturing, such programming may be facilitated by embodiments of the NFC system(s) described herein. For example, a power supply system may be field- or user-configurable. Embodiments of this disclosure help to reduce complexity in on-site programming. Firmware updates may also be performed while the unit is physically installed in the end system. Latest firmware may be retrieved from a server using the communication device 303, for example, and programmed into the target system 300. Additionally, data can be sniffed out from the target system 300 while in operation mode without interfering with normal operations or internal wiring of the system.

Whether using a passive or active device, communication between the communication device 303 and the tag 301 may be subject to authentication and/or other security protocols to ensure approved usage.

Figure 4:
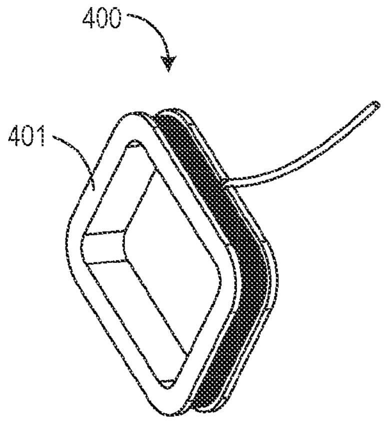
FIG. 4 illustrates an embodiment of a portion of an antenna assembly according to an example.

FIG. 4 illustrates an embodiment of a portion of an antenna assembly 400 according to an example. The wires 309 connectable to the tag 301 extend around a bobbin 401 to create a multi-loop coil antenna. The size of the bobbin and the number of turns of the wires 309 may be designed to facilitate communication with the communication device 303 via the NFC communication protocol.

Figure 5:
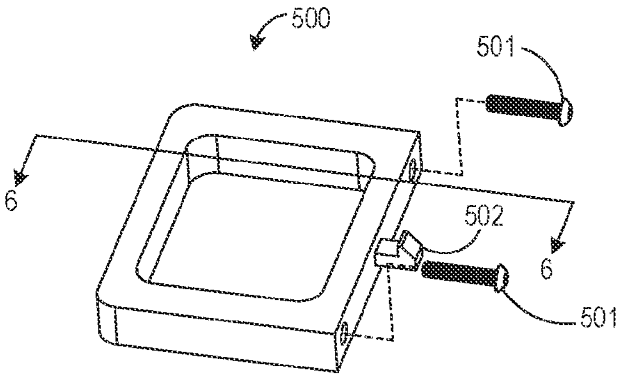
FIG. 5 illustrates an embodiment of the antenna assembly according to an example.

FIG. 5 illustrates an embodiment of the antenna assembly 400 according to an example. The wound bobbin assembly shown in FIG. 4 is embedded within an outer handle shell 500. An opening in the outer handle assembly 500 allows the wires 309 to extend from the bobbin to the tag 301. One or more fasteners 501 may be coupled with the outer handle assembly 500 through a front wall of the housing 304 to mechanically secure the outer handle assembly 500 to the exterior of the housing 304. Alternatively or in addition thereto, one or more snap tabs 502 may extend from outer handle assembly 500 and be insertable into mating snap receptacles formed in the front wall of the housing 304.

Figure 6:
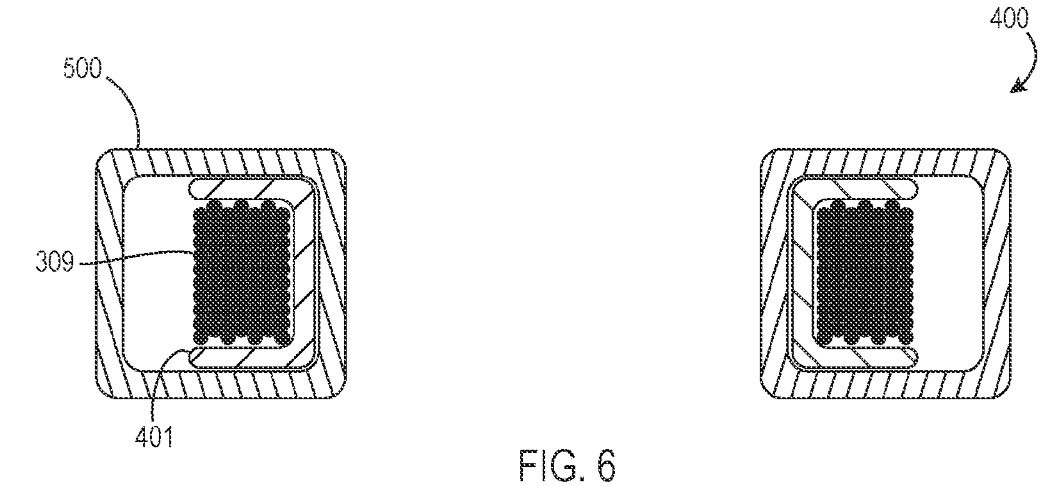
FIG. 6 illustrates a cross-sectional view along line 6-6 of FIG. 5.

FIG. 6 illustrates a cross-sectional view along line 6-6 of FIG. 5. As shown, the bobbin 401 has wires 309 wound therearound and is embedded within the outer handle assembly 500. In an example, the outer handle shell 500 may be over-molded around the wound bobbin 401.

Figure 7:
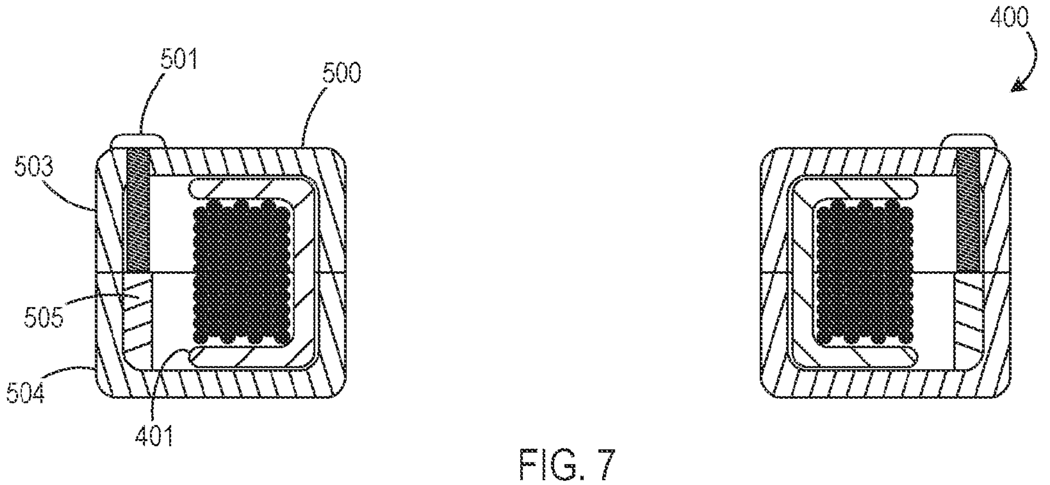
FIG. 7 illustrates an embodiment of the antenna assembly according to another example.

FIG. 7 illustrates an embodiment of the antenna assembly 400 according to another example. The outer handle shell 500 includes a first half 503 and a second half 504. The second half 504 has a fastener receptacle 505 formed therein that accepts the fastener 501 therein for securing the first and second halves 503, 504 together.

Figure 8:
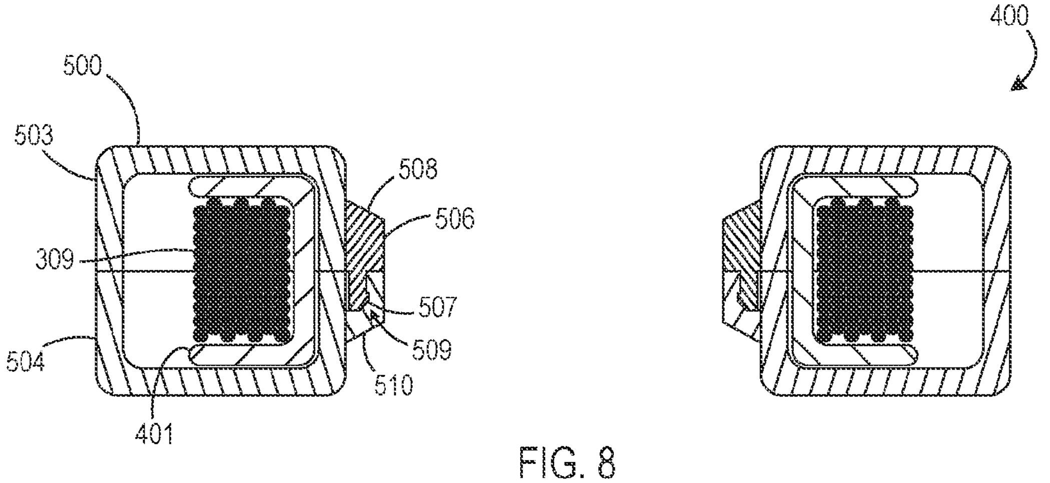
FIG. 8 illustrates an embodiment of the antenna assembly according to another example.

FIG. 8 illustrates an embodiment of the antenna assembly 400 according to another example. The first half 503 includes a fastener tab 506 having a male connector 507 extending from a base 508. A female receptacle 509 of a second fastener tab 510 is configured to mate with the male connector 507 is attached to the second half 504. In this manner, the first and second halves 503, 504 may be pressed together to engage the male connector 507 with the female receptacle 509 to secure the antenna assembly 400.

Figure 9:
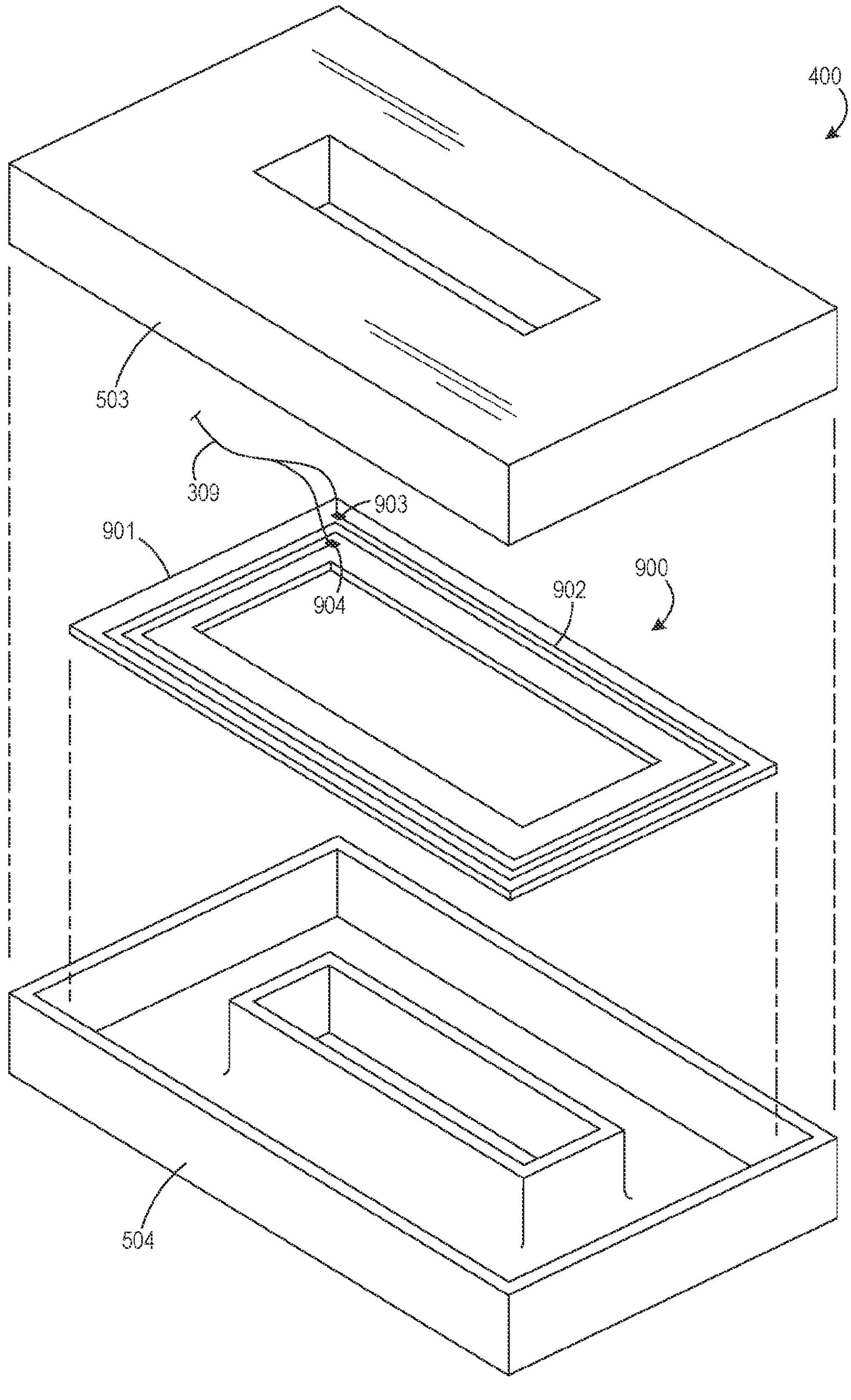
FIG. 9 illustrates an embodiment of the antenna assembly according to another example.

FIG. 9 illustrates an embodiment of the antenna assembly 400 according to another example. In contrast to the bobbin assembly positioned within the antenna assembly 400 as illustrated in FIGS. 6-8, the interior volume of the first and second halves 503, 504 of the handle 311 contains a printed circuit board (PCB) antenna assembly 900. A PCB 901 has a copper trace antenna 902 formed thereon and connected between starting and ending connection pads 903, 904. The wires 309 are coupled to the starting and ending connection pads 903, 904 for communicating the antenna signals with the tag 301. The size of the PCB 901 and the length and number of spiral turns of the copper trace antenna 902 may be designed to facilitate communication with the communication device 303 via the NFC communication protocol. The first and second halves 503, 504 of the handle 311 may be fastened together as described in one or more of the embodiments herein.

Figure 10:
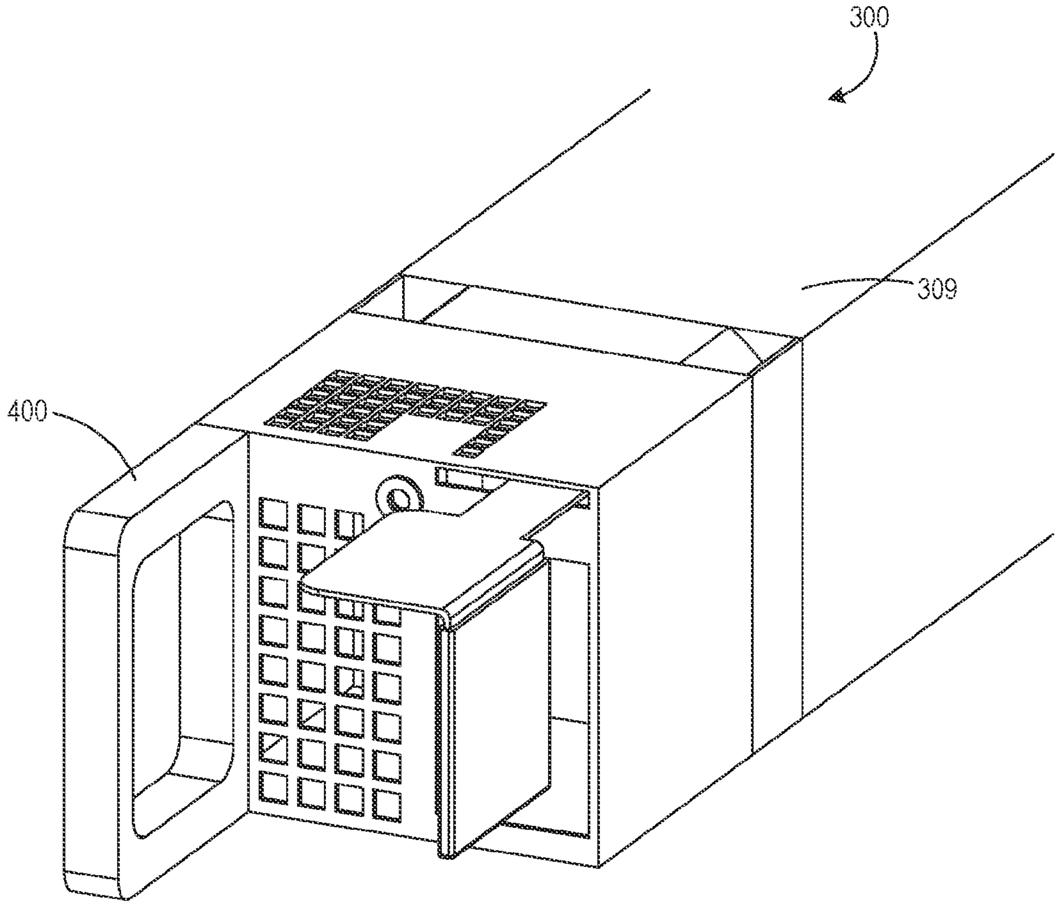
FIG. 10 illustrates a perspective view of a portion of the target system showing the antenna assembly fastened to the housing.

FIG. 10 illustrates a perspective view of a portion of the target system 300 showing the antenna assembly 400 fastened to a front of the housing 304. Thus, embodiments of the disclosure provide communication with the tag 301 from a front of the target system 300.

Figure 11:
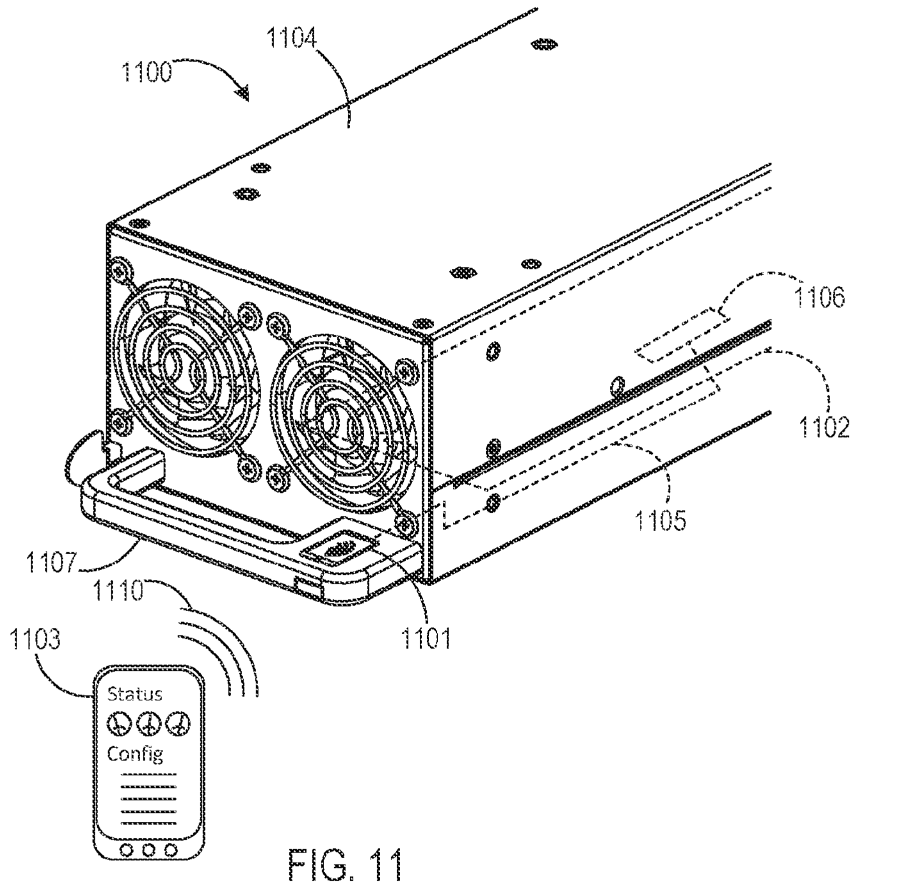
FIG. 11 illustrates an NFC communication arrangement according to another embodiment.

FIG. 11 illustrates an NFC communication arrangement according to an embodiment. A target system 1100 such as a power supply is equipped with an NFC transceiver or tag device 1101 for communicating operational parameters and other information of a power converter 1102 of the power supply with an external NFC communication device 1103. The target system 1100 includes a metal housing 1104 having an internal volume into which the power converter 1102 is positioned. One or more communication wires 1105 couple the tag 1101 with a power converter communication component such as a communication IC 1106. Communication via the communication wires 1105 provides the tag 1101 with access to information of the power converter 1102 such as operational status parameters, configuration parameters, reporting parameters, and other information provided for communication outside the system. Communication between the tag 1101 and the communication IC 1106 may be based on the I2C protocol or other low-power communication protocol, for example.

The tag 1101 is positioned within a handle 1107 mechanically attached to the housing 1104. The handle 1107 provides support for carrying the power supply, installing the power supply within a rack system, removing the power supply from the rack system, and other physical manipulations of the power supply. In one embodiment, tag 1101 is removably positionable within a cavity of the handle 1107 (see FIG. 12). In another embodiment, the tag 1101 is permanently embedded within the handle 1107.

In one embodiment, the tag 1101 is a passive device that receives energizing power from the carrier fields 1110. The energizing power is sufficient to activate the tag 1101 and to establish communication with the communication device 1103. The energizing power may further be sufficient to power the communication IC 1106, which has stored therein the parameters of interest. By also providing power for the communication IC 1106, the communication device 1103 may be able to receive status, configuration, and other parameters of the power converter 1102 without the power converter 1102 needing to be active, operational, or having additional power being supplied thereto. In another embodiment, while in operation, the power converter 1102 may cause the communication IC 1106 to update reportable parameters to the tag 1101 for storage until requested by the communication device 1103. In this case, the energizing power for activating the tag 1101 may be sufficient to power the tag 1101 without also providing power to the communication IC 1106.

The passive device mode allows the target system 1100 to be equipped with a built-in NFC interface that can be used to retrieve and write small size data. For example, the target system 1100 can be configured during manufacturing or after receipt by a customer without applying input supply power to the unit. Examples of such configuration include enabling/disabling features, changing device address, setting limits and timings, etc. In addition, black-box data or fault history logs can be retrieved from a system that has had a hard failure and can no longer power up.

In another embodiment, the tag 1101 is an active device and receives operational power from the power converter 1102. As such, the tag 1101 may be available for communication while the power converter 1102 is supplying power to the tag 1101 but unavailable in the absence of supplied power from the power converter 1102. The active, or powered, mode allows larger data transfers than the passive mode. For example, if in-system programming was not implemented during manufacturing, such programming may be facilitated by embodiments of the NFC system(s) described herein. For example, a power supply system may be field- or user-configurable. Embodiments of this disclosure help to reduce complexity in on-site programming. Firmware updates may also be performed while the unit is physically installed in the end system. Latest firmware may be retrieved from a server using the communication device 1103, for example, and programmed into the target system 1100. Additionally, data can be sniffed out from the target system 1100 while in operation mode without interfering with normal operations or internal wiring of the system.

Whether using a passive or active device, communication between the communication device 1103 and the tag 1101 may be subject to authentication and/or other security protocols to ensure approved usage.

Figure 12:
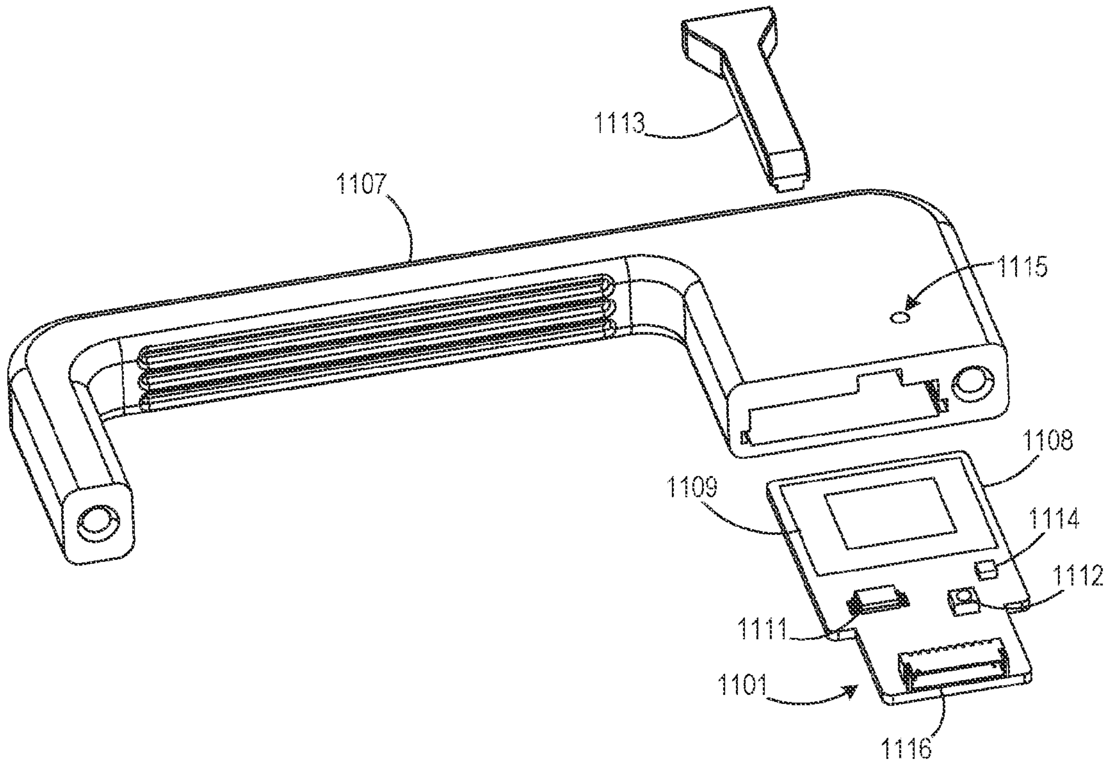
FIG. 12 illustrates an exploded, isometric view of the chassis handle having an integrated NFC tag of FIG. 11 according to an embodiment.

FIG. 12 illustrates an exploded, isometric view of the chassis handle 1107 having the NFC tag 1101 of FIG. 11 according to an embodiment. The tag 1101 includes a printed circuit board (PCB) 1108 having formed thereon one or more loops of copper spiraled along a path to form an NFC antenna 1109. To reduce interference with the carrier fields 1110 (shown in FIG. 11) transmitted between the antenna 1109 and the communication device 1103, the handle 1107 may be constructed of carrier field permeable materials and/or positioned close to an exterior surface of the handle 1107 while still remaining protected within the interior volume of the handle 1107. The exterior positioning of the antenna 1109 relative to the interior volume of the housing 1104 allows the tag 1101 to communicate with the communication device 1103 with less interference and damping effects.

A controller 1111 of the tag 1101 provides communication with the communication device 1103 and with the communication IC 1106. The tag 1101 may also include an indicator device such as an LED 1112 that, together with a light pipe 1113, provides a visual indication of an operation of the tag 1101. An ambient temperature sensor 1114 configured to align with an ambient sensor peep hole 1115 in the handle 1107 allows the sensing of the ambient temperature adjacent to the handle 1107. A connector 1116 attached to an end of the PCB 1108 provides a connection with a mating connector (see FIG. 13) coupled to the communication wires 1105 to facilitate removal and installation of the handle 1107.

Figure 13:
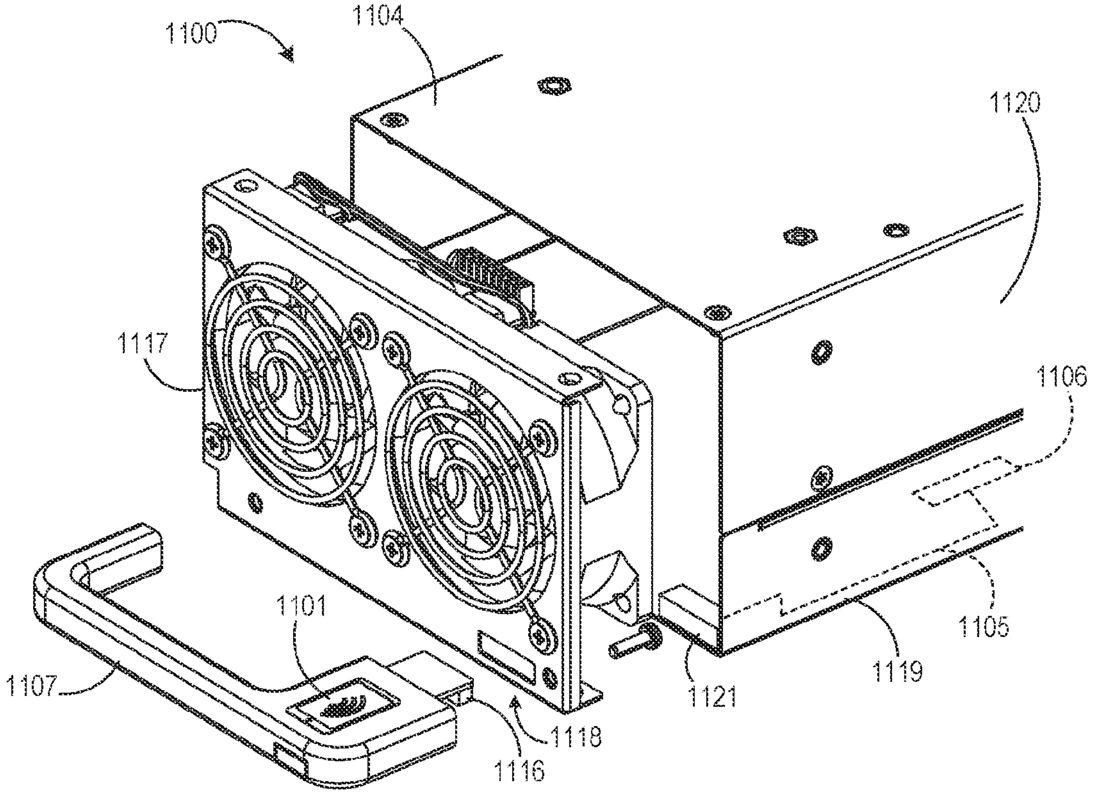
FIG. 13 illustrates an exploded, isometric view of a front portion of the system of FIG. 11 according to an embodiment.
Figure 14:
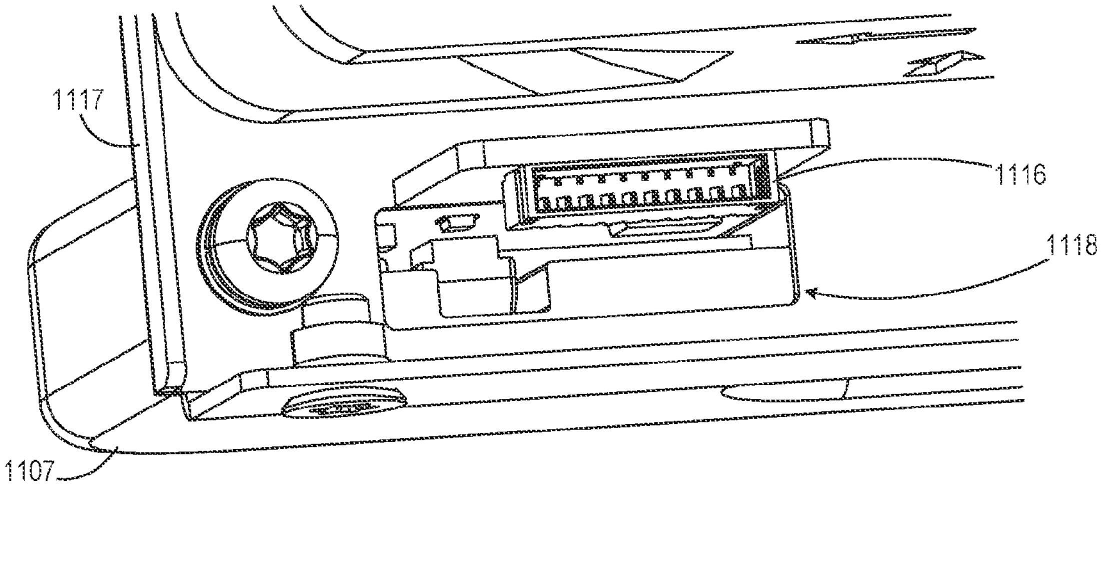
FIG. 14 illustrates an isometric view of a portion of the front wall and handle with the tag connector extending therethrough according to an embodiment.

FIG. 13 illustrates an exploded, isometric view of a front portion of the system of FIG. 11 according to an embodiment. A front wall of the target system 1100, formed as a panel-fan assembly 1117 includes a tag port 1118 through which a portion of the tag 1101 may extend to couple with a mating connector 1121. The tag 1101 including the connector 1116 may extend through the tag port 1118 as illustrated in FIG. 14, which shows an isometric view of a portion of the front wall and handle with the tag connector extending therethrough according to an embodiment. As illustrated in FIG. 13, the housing 1104 may be formed as a multi-part housing including, for example, a base 1119 and a cover 1120.

Figure 15:
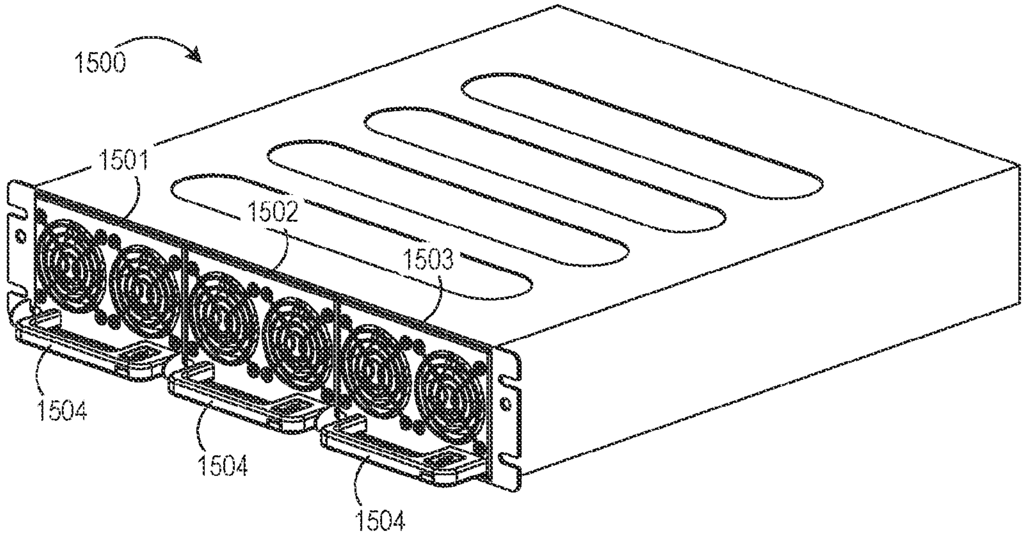
FIG. 15 illustrates an isometric view of a power supply system according to an embodiment.

FIG. 15 illustrates an isometric view of a power supply system 1500 according to an embodiment. System 1500 includes three power supply units power supply unit 1501, 1502, 1503 incorporating NFC-enabled handles 1504 based on one or more of the embodiments described herein.

Embodiments of the disclosure may provide a power supply unit with an innovative handle that includes a NFC communications circuit for internally interfacing with a power supply digital control circuit. Via the external handheld FNC device, various parameters of the power supply unit can be configured, read from, and written to. Such configuration may be accomplished on a live, operational system or on an unenergized power supply unit. As various power supply unit parameters can be configured on an unenergized system from outside the system (e.g., with a suitable communication platform/application), great flexibility and ease are provided to end users, and special training in order to acquire the know-how of the system, communication protocols, etc. can be reduced or eliminated. Some examples of power supply unit parameters configurable with embodiments described herein include setting output voltage, current, and power values, setting output ON/OFF including fault diagnostics, monitoring input and/or output power, and the like. Additionally, embodiments allow for setting or retrieving PSU FRU parameters, PSU black box data, E-trace data storage during the PSU manufacturing process, and provide flexibility of uploading/downloading PSU parameters, status logs, etc. on the fly with a live system without interrupting system function.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A wireless communication system comprising:
a transceiver comprising an antenna;
a housing having an interior volume;
a handle coupled to the housing externally from the interior volume; and
an ambient temperature sensor positioned adjacently to a peep hole formed in the handle;
wherein the antenna is positioned within the handle; and
wherein the ambient temperature sensor is configured to sense an ambient temperature adjacent to the handle.

2. The wireless communication system of claim 1, wherein the transceiver is positioned within the interior volume.

3. The wireless communication system of claim 1, wherein the transceiver is positioned within the handle.

4. The wireless communication system of claim 1, wherein the antenna comprises one or more wound loops of wire positioned within an interior volume of the handle.

5. The wireless communication system of claim 1 further comprising a light emitting diode and a light pipe;
wherein the light emitting diode and the light pipe provide a visual indication of an operation of the transceiver.

6. The wireless communication system of claim 5, wherein a portion of the light pipe is flush with an exterior surface of the handle.

7. The wireless communication system of claim 1, wherein the antenna comprises a copper trace antenna formed on a printed circuit board;
wherein the printed circuit board is positioned within an interior volume of the handle.

8. The wireless communication system of claim 1, wherein the housing is metallic.

9. The wireless communication system of claim 1, wherein the housing shields wireless electrical signals.

10. The wireless communication system of claim 1, wherein the housing is electrically conductive.

11. A method of making a wireless communication system comprising:

positioning a communication antenna of a transceiver assembly within a handle;

coupling the handle to an exterior of an enclosure, the enclosure having an interior volume;

wherein the transceiver assembly comprises a near field communication (NFC) tag device comprising:

a printed circuit board (PCB); and a communication controller attached to the PCB and configured to wirelessly communication with an external wireless communication device;

wherein the communication antenna is formed on the PCB; and wherein positioning the communication antenna within the handle comprises inserting at least a portion of the NFC tag device within the handle; and wherein the method further comprises:

coupling a light emitting diode to the PCB;

configuring the light emitting diode to provide a visual indication of an operation of the NFC tag device; and coupling a light pipe to the handle;

wherein the light pipe and the light emitting diode provide a visual indication of an operation of the NFC tag device.

12. The method of claim 11, wherein the NFC tag device further comprises a connector attached to the PCB; and wherein the connector is configured to connect to a mating connector coupled to the housing to facilitate wired communications between the communication controller and a communication integrated circuit positioned within the enclosure.

13. The method of claim 12, wherein the PCB extends the connector within the interior volume in response to the handle being coupled to the exterior of the enclosure.

14. The method of claim 11, wherein the enclosure is electrically conductive.

15. The method of claim 11 further comprising coupling an ambient temperature sensor to the PCB; and configuring the ambient temperature sensor to sense an ambient temperature adjacent to the handle.

16. The method of claim 15 further comprising forming an ambient temperature sensor peep hole in the handle;

wherein the ambient temperature sensor peep hole and the ambient temperature sensor are aligned with one another when the at least a portion of the NFC tag device is inserted within the handle.

17. A wireless communication system comprising:

a transceiver comprising an antenna;

a housing having an interior volume;

a handle coupled to the housing externally from the interior volume; and a light emitting diode and a light pipe;

wherein the antenna is positioned within the handle; and wherein the light emitting diode and the light pipe provide a visual indication of an operation of the transceiver.

* * * * *